(12) United States Patent
Burnstad et al.

(10) Patent No.: US 8,095,320 B2
(45) Date of Patent: Jan. 10, 2012

(54) METHOD, PROGRAM PRODUCT, AND SYSTEM FOR SUPPRESSION OF RESIDUAL WATER BOTTOM ENERGY IN SURFACE SEISMIC DATA

(75) Inventors: Roy Matthew Burnstad, Dhahran (SA); Mahmoud Elabd Hedefa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 357 days.

(21) Appl. No.: 12/394,868

(22) Filed: Feb. 27, 2009

(65) Prior Publication Data
US 2009/0222211 A1    Sep. 3, 2009

Related U.S. Application Data

(60) Provisional application No. 61/032,637, filed on Feb. 29, 2008.

(51) Int. Cl.
G01V 1/38 (2006.01)
G01V 1/36 (2006.01)

(52) U.S. Cl. ............... 702/17; 702/12; 702/14; 702/16; 367/21; 367/24; 367/53; 367/73; 367/83; 703/5; 703/10

(58) Field of Classification Search ............ 702/12, 702/14, 16, 17; 367/24, 53, 73, 83, 21; 703/5, 703/10
See application file for complete search history.

(56) References Cited

U.S. PATENT DOCUMENTS

| | | | |
|---|---|---|---|
| 3,370,268 A | 2/1968 | Dobrin | |
| 3,512,127 A | 5/1970 | Burg | |
| 5,696,734 A * | 12/1997 | Corrigan | 367/24 |
| 6,026,059 A | 2/2000 | Starr | |
| 6,151,275 A | 11/2000 | Starr | |
| 6,154,705 A | 11/2000 | McCormack et al. | |
| 6,263,285 B1 | 7/2001 | Starr | |
| 6,678,207 B2 | 1/2004 | Duren | |
| 6,735,527 B1 | 5/2004 | Levin | |
| 2006/0050611 A1 | 3/2006 | Borresen | |

OTHER PUBLICATIONS

Davies et al. "Multichannel Deconvolution Filtering of Field Recorded Seismic Data" Geophysics, vol. 33, No. 5, Oct. 1968. XP-002534767.
International Search Report and Written Opinion, Application No. PCT/US2009/035432, dated Sep. 11, 2009.
Morley, L, Abstract, "Predictive deconvolution in shot-receiver space," Geophysics vol. 48. No. 5 (May 1983), pp. 515-531.
Levin, S., Abstract, "Surface-consistent deconvolution," Geophysics, vol. 54, No. Y, (Sep. 19X), pp. 1123-1133, 1989.
Cambois, G., Abstract, "Surface-consistent deconvolution in the log/Fourier domain," Geophysics. vol. 57, No. 6 (Jun. 1992), pp. 823-x40.
Buttkus, B., Abstract, "Enhancement of Deep Seismic Reflections in Pre-stack Data by Adaptive Filtering," SAO/NASA ADS Physics Abstract Service, 1999, found at http://adsabs.harvard.edu.

* cited by examiner

*Primary Examiner* — Sujoy Kundu
(74) *Attorney, Agent, or Firm* — Bracewell & Giuliani, LLP

(57) ABSTRACT

Systems, program product, and methods of suppressing residual water bottom energy in seismic data, are provided. An example of a system, program product, and method can be applied to post-stack datasets and can combine multi-channel deconvolution with novel sorting keys to efficiently identify and suppress residual water bottom energy in common depth point (CDP) stacked seismic data, thereby increasing the resolving power of seismic data leading to an improved interpretation of seismic signals reflected from oil reservoirs.

40 Claims, 11 Drawing Sheets
(9 of 11 Drawing Sheet(s) Filed in Color)

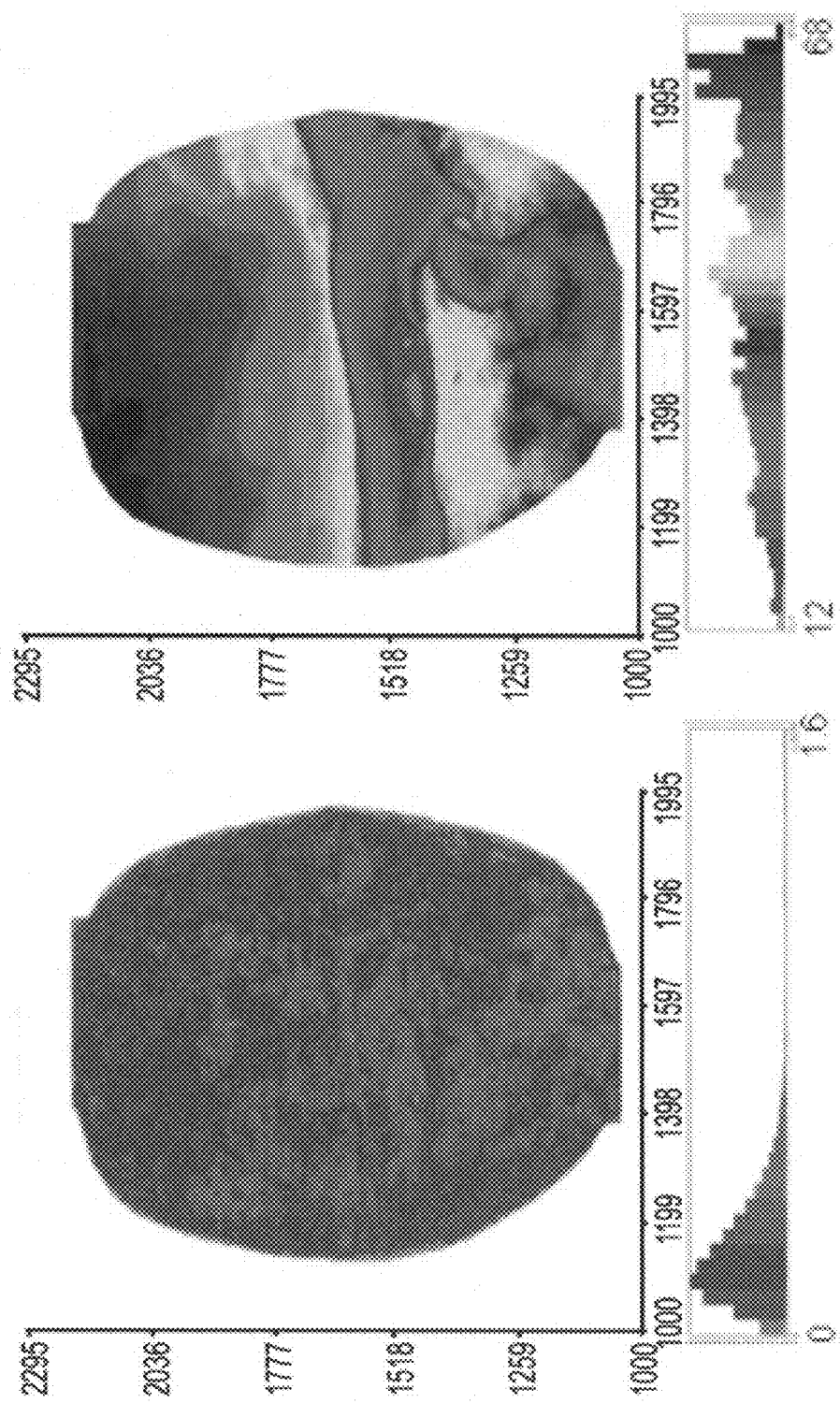

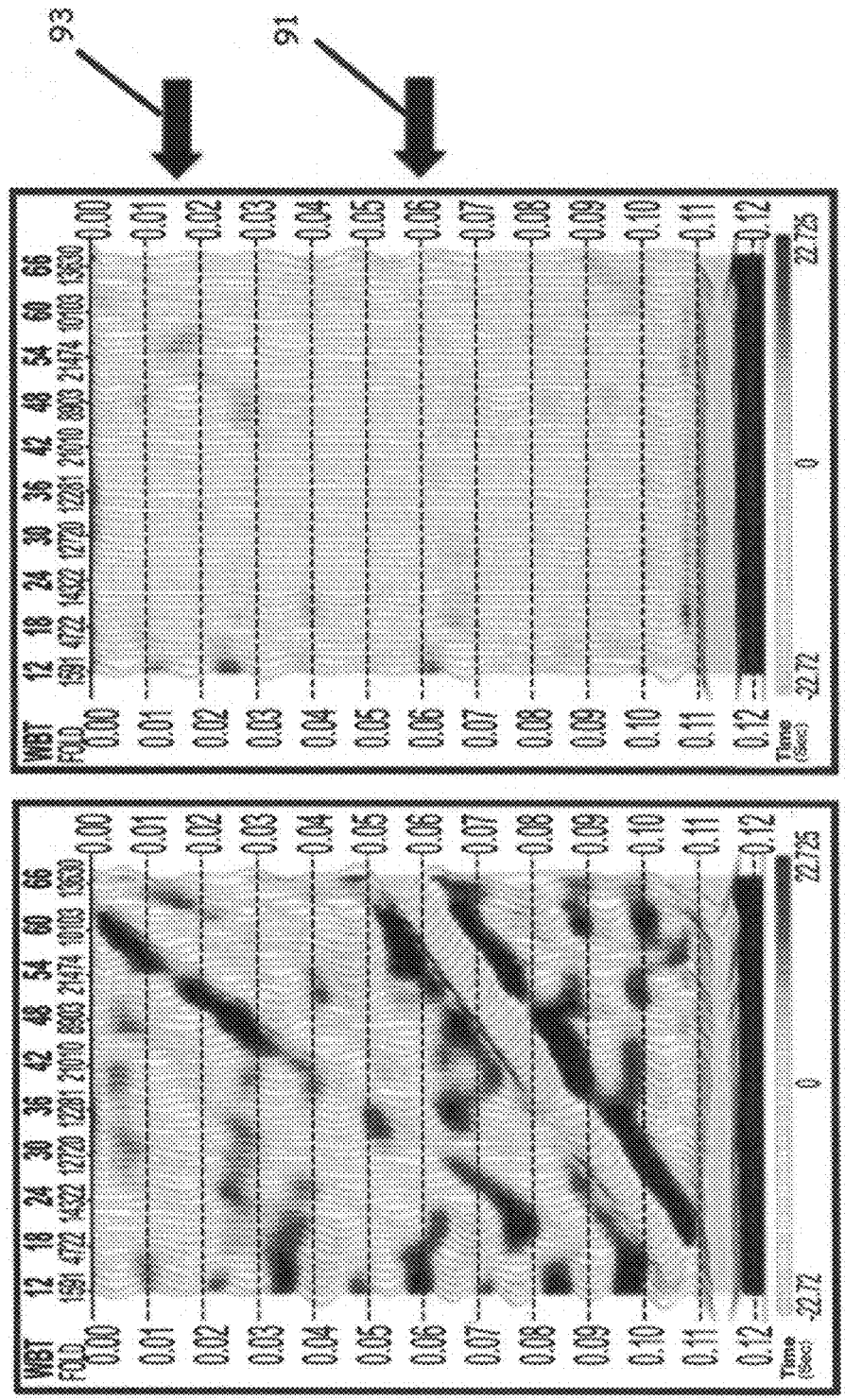

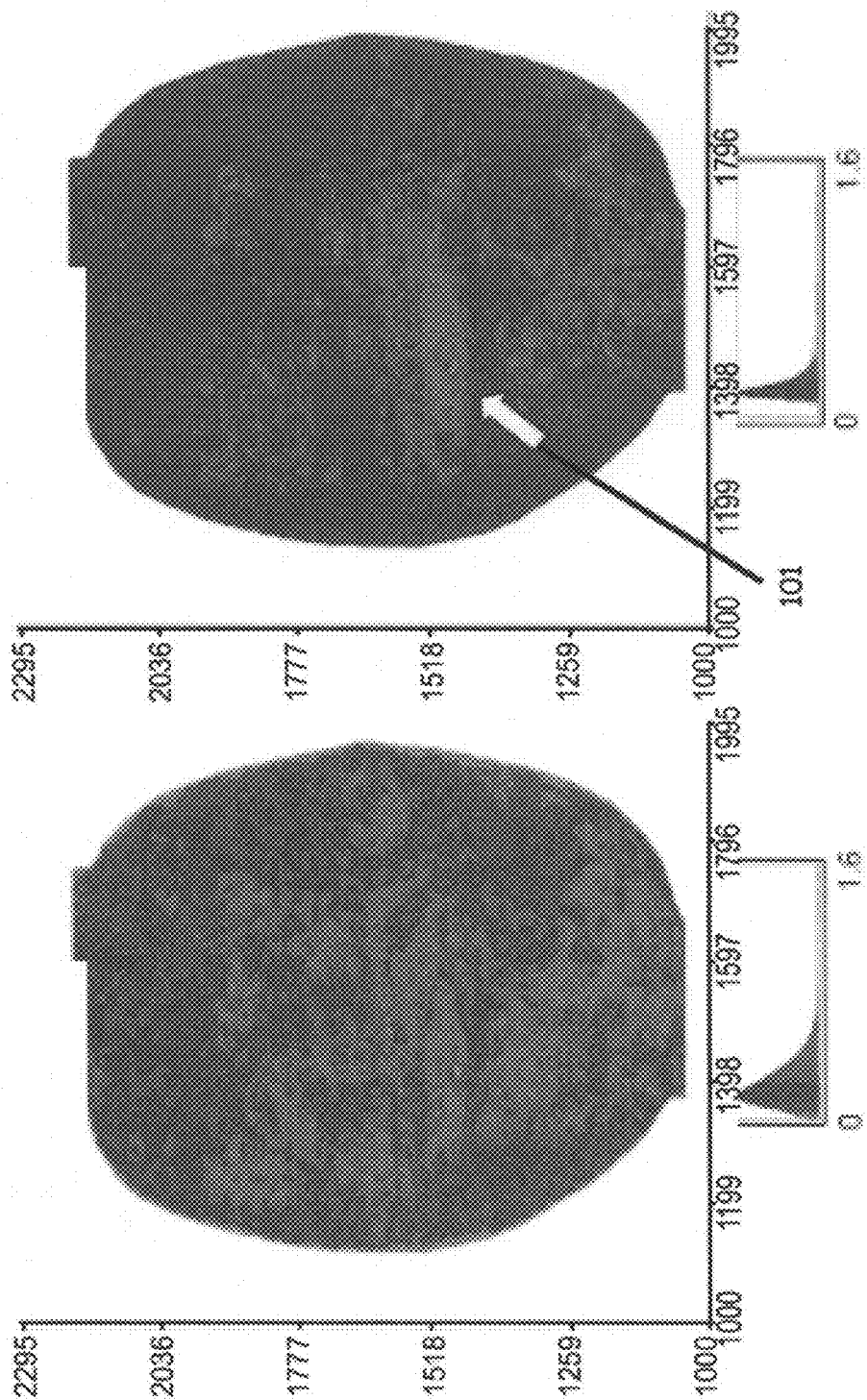

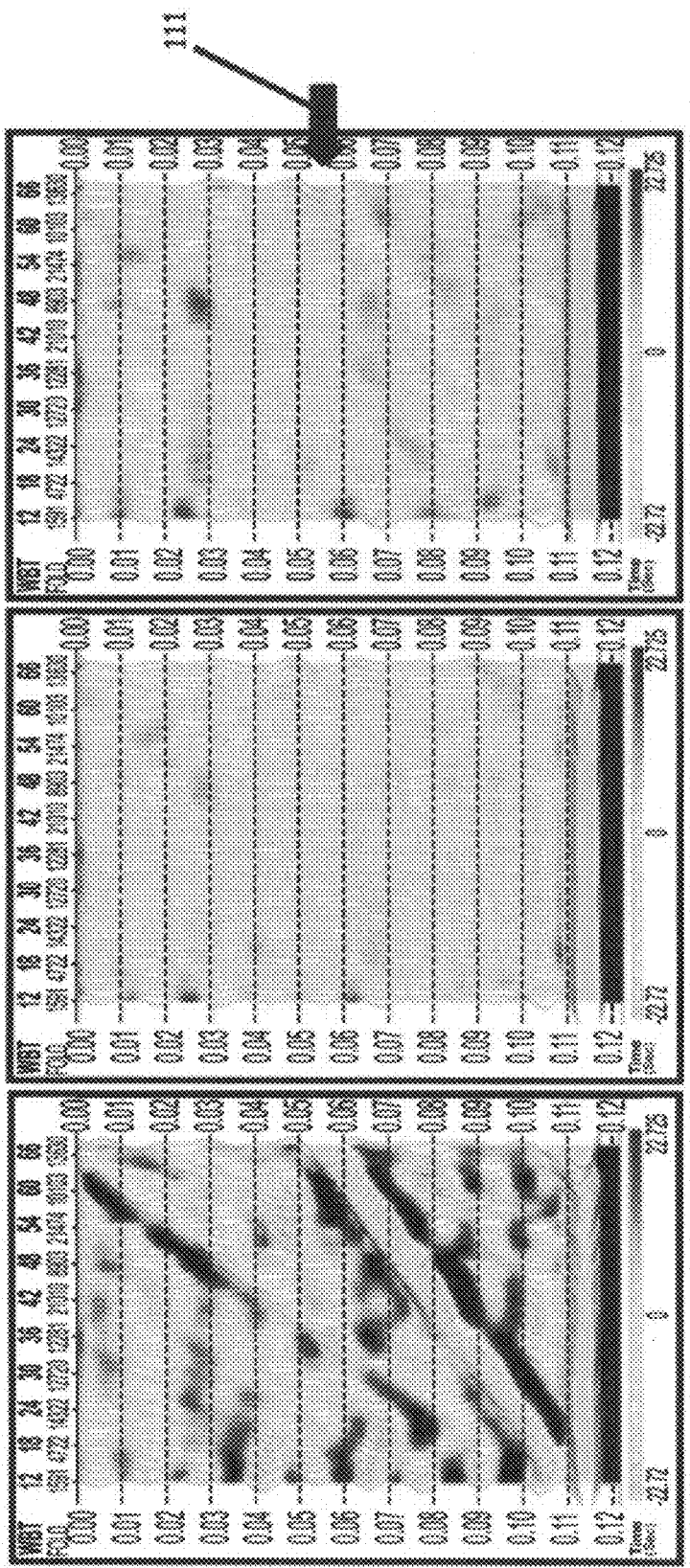

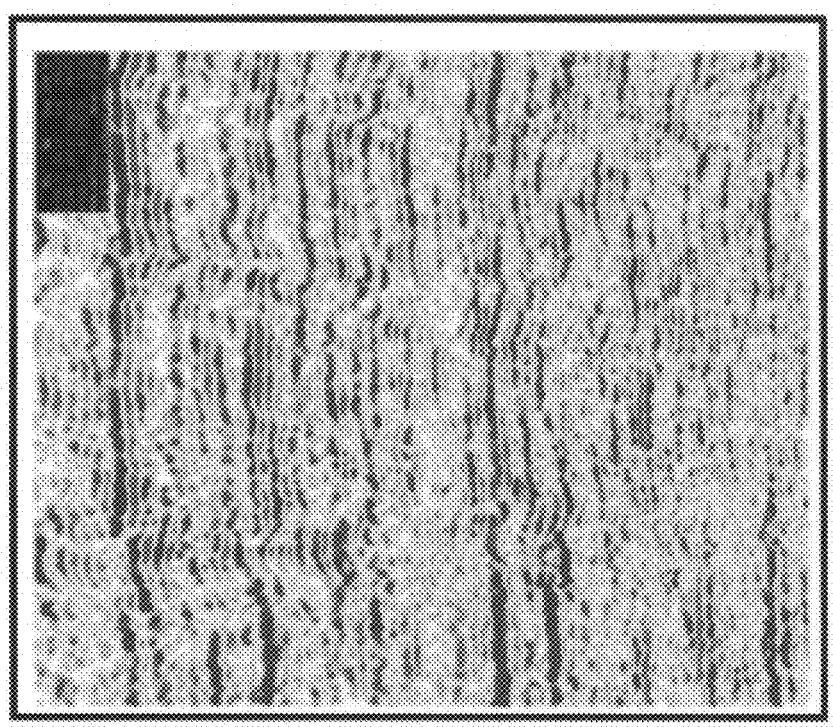
FIG. 11B.
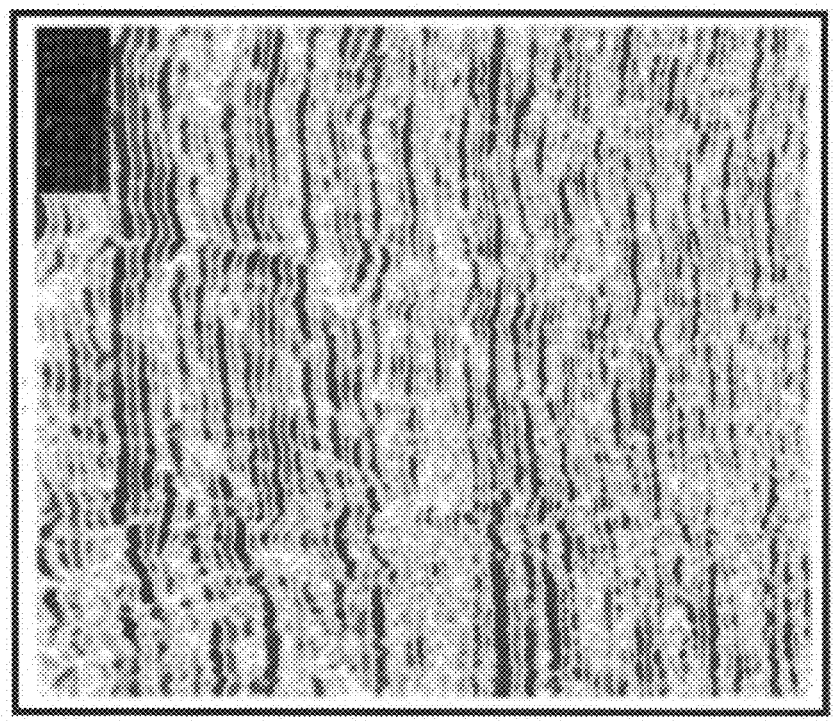
FIG. 11A.

METHOD, PROGRAM PRODUCT, AND SYSTEM FOR SUPPRESSION OF RESIDUAL WATER BOTTOM ENERGY IN SURFACE SEISMIC DATA

RELATED APPLICATIONS

This application is a non-provisional of and claims the benefit of and priority to U.S. Provisional Application No. 61/032,637 by Burnstad et al., filed on Feb. 29, 2008, titled "Method, Program, Product, and System for Suppression of Residual Water Bottom Energy in Surface Seismic Data," and U.S. Provisional Application No. 61/033,012 by Burnstadt et al., filed on Mar. 2, 2008, titled "Method, Program, Product, and System for Suppression of Residual Water Bottom Energy in Surface Seismic Data," each incorporated by reference in its entirety.

BACKGROUND OF THE INVENTION

1. Field of the Invention

The invention relates to the field of seismic data processing. In particular, the invention relates to systems, program products, and related methods for suppressing undesirable energy, particularly in the form of residual water bottom energy, in seismic data.

2. Description of Related Art

Seismic reflections/refraction data can be collected in marine environments with a receiver array deployed on the sea floor. Such data retrieval systems, however, record, along with the usable data, a significant amount of energy that is trapped in the water layer. This energy infects the entire seismic section by following each and every recorded signal from deeper events. This unwanted energy is typically very high amplitude relative to the recorded reflections. Another term for this effect, which originates from the nature of the energy itself, is "ghost" energy. That is, as good seismic signals are recorded, they are followed by water bottom signals in a ghost like fashion. These ghost events may constructively combine to the point where the desired reservoir signals are nearly undetectable. In marine surveys using ocean bottom cables, in particular, energy trapped in the water layer is recorded, at least in part, due to the position of the cable on the sea bottom. This unwanted energy is typically very high amplitude relative to the recorded reflections. During early surveys of this type, these high amplitude levels could not be addressed by industry standard single channel gapped deconvolution. This limited the use of ocean bottom cable acquisition to only the most of shallow of water depths as this tends to cancel trapped water bottom energy.

The same issue has caused ocean bottom cable systems to evolve over the past 20 years. State-of-the-art seismic data collection and processing systems have evolved to try to deal with this issue. For a combination of reasons, these systems do not completely suppress ghost energy. Modern cable configurations have at least two sensors, a hydrophone and a velocity phone, which record desired reflection signals at one polarity and undesired water bottom energy at opposite polarities. Upon summing these two sensors, ideally the water bottom energy cancels and the desired signals reinforce. This dual sensor design allows cables to be deployed to deeper water depths, which is a great advance for the industry as it allow acquisition in areas deep water vessels could not previously access. Unfortunately, the efficiency of that summation process is dependent on a number of factors. These factors include how well coupled the cable is to the sea bottom, what type of sediments the cable rests in, and how rugged the sea bottom topography is. Prior to summation, several industry standard processing steps occur to combat these issues. They include scaling, noise removal, and wave field separation, to name a few. All of these steps target the water bottom energy, but do not completely suppress it. To make matters worse, the residual levels may vary across a project, depending on the efficiency of the summation.

Industry standard pre-stack processing techniques, including surface consistent deconvolution in the source, receiver, mid-point, and offset domain, have been employed to target this energy. Such techniques, however, do not provide a measure of the residual water bottom energy left in the data. These unknown, spatially variable energy signals eventually cause an interpreter of the data to lose confidence in the seismic data as it will not be clear if observed variable amplitudes are due to residual water bottom energy or important lithologic characteristics of the reservoir.

Industry standard, post-stack, single channel, deconvolution has also been employed. Such post-stack, single channel, deconvolution is normally applied on stack data to attenuate reverberation effects such as residual water bottom energy. In such techniques, an autocorrelation calculated from a window of data on the stacked seismic trace, sometimes mixed with one or two neighboring traces, is typically used in a standard predictive deconvolution (e.g., Weiner-Levinson) algorithm to obtain a causal inverse filter which is applied to the data. Recognized by the inventors, however, is that as residual water bottom amplitude levels change across the prospect area, sometimes above and sometimes below recorded signal and background noise levels, industry standard techniques based on a single autocorrelation have a difficult time distinguishing residual water bottom energy from other desired events that may have a reverberatory signature, such as periodic geological reflectors. The result is a sub-optimum suppression of undesired water bottom energy along with a potential suppression of desired signals.

Accordingly, recognized by inventors is that deficiencies of prior systems and techniques/methodologies include improper summation of dual sensor ocean bottom cable data, inefficient pre-stack or post-stack predictive deconvolution operator design, and a lack of quality control plots that locate problem areas or measure residual amplitude levels in the data. These deficiencies lead to variable levels of residual water bottom energy in the data that reduce its resolving power and interpretability.

Thus, recognized by inventors is the need for a system, program product, and computer implemented methods which can efficiently find and suppress residual water bottom energy from seismic data volumes, thereby effectively increasing the resolving power of seismic data—thus, leading to an improved interpretation of seismic signals reflected from oil reservoirs. Further, recognized is the need for a cost effective system, program product, and computer implemented methods that effectively identify residual multiple energy which only require stack data, and thus, can be executed on desktop workstations, rather than an enormous computer system, as is generally required by multi-channel industry techniques/methodologies which rely on pre-stack data.

Also, recognized by inventors is the need for an improved system, program product, and computer implemented methods which implement a multi-channel post-stack deconvolution that leverages redundancy in sub-line, cross-line, and water bottom time domains to arrive at efficient predictive deconvolution operators for the seismic data, and which provide efficient quality control plots to allow a user to spatially analyze the levels of residual water bottom energy in the seismic data. Recognized is that by efficiently suppressing side lobes on reflection events caused by residual water bottom energy, such system, program product, and methods can create a seismic volume that has a higher resolving power. The transformation of raw seismic data into seismic data with a substantially higher resolving power would provide a significant benefit to a seismic data interpreter using the seismic data to estimate reservoir properties and guide horizontal drilling campaigns.

SUMMARY OF THE INVENTION

In view of the foregoing, various embodiments of the present invention provide systems, program product, and computer implemented methods, which address the source of the problems in seismic data processing and provide systems, program product, and methods which address and overcome the adverse side effects of residual water bottom energy by adapting the process to the specific data. Various embodiments of the present invention include systems, program product, and methods, for example, designed to efficiently locate and suppress residual water bottom energy from within seismic data volumes. Various embodiments of the present invention implement a data processing procedure applied to post-stack datasets. Various embodiments of the present invention combine multi-channel deconvolution with novel sorting keys to efficiently identify and suppress residual water bottom energy in common depth point (CDP) stacked seismic data in a cost effective way. Various embodiments of the present invention advantageously increase the resolving power of seismic data—thus, leading to an improved interpretation of seismic signals reflected from oil reservoirs.

Specifically, various embodiments of the present invention provide computer implemented/facilitated methods of suppressing residual water bottom energy in seismic data. According to an example of an embodiment of such methods, a method can include the step of obtaining seismic post-stack data and applying a multi-domain deconvolution to the seismic post-stack data to thereby suppress residual water bottom energy in a seismic data volume. This step can include using a combination of common water bottom times and sub-line numbers as an autocorrelation averaging reference for the multi-domain deconvolution to thereby suppress residual water bottom energy detection. In an embodiment of the method, the step can further include stacking seismic data into common depth point bins to form the three-dimensional stack data volume including a plurality of seismic traces, performing a plurality of autocorrelations on each of the plurality of stacked seismic traces, averaging the correlated data in a plurality of domains, determining a plurality of predictive deconvolution inverse operators responsive to the average correlated data in the plurality of domains, applying the predictive deconvolution inverse operators to the seismic data, and identifying water bottom energy present in the seismic data responsive to application of the predictive deconvolution inverse operators to the seismic data. The method can also include a computer or interpreter using quality control plots to spatially analyze the levels of residual water bottom energy in the data.

According to another example of an embodiment of the present invention, the method can include: (a) reading in stacked seismic data with cross-line and sub-line numbers in the header; (b) reading in two-way water bottom time for each trace and placing it in the header; (c) reading a sub-surface horizon time for each trace and storing it in the header; (d) flattening the seismic data so the reference horizon is positioned at a constant time for all traces in the volume; (e) extracting a time window from the flattened seismic volume; (f) computing autocorrelations from the extracted time window for each trace in the volume; (g) measuring the autocorrelation amplitude level on each trace at the two way water bottom time and plotting the value as a quality control map; (h) deriving a plurality of mean autocorrelations using the output from step (f); (i) saving the mean autocorrelations to disk; (j) using at least one of the mean autocorrelations of step (h) to stack the data into common water bottom time bins and display the result in trace format as a quality control plot; (k) measuring at least one of the autocorrelations of step (h) for an amplitude value at the time sample which corresponds to the two way water bottom time and plotting the results as a quality control map; (l) obtaining two causal inverse filters to apply to each trace in the stack volume; (m) applying the operators from step (l) to the data from step (c) and saving the output to disk; (n) using the output from step (m), repeating steps (d) through (k) to evaluate the effectiveness of step (m); and (o) changing the operator design parameters in step (l) and re-running step (m) if desired.

Embodiments of the present invention can also include program product stored in tangible computer-readable memory or other medium, readable by a computer, and including a set of instructions so that when executed by the computer, caused the computer to perform various operations to suppress residual water bottom energy. According to an example of an embodiment of the program product, the operations can include obtaining seismic data and using a combination of common water bottom times and sub-line numbers as an autocorrelation averaging reference for multi-domain deconvolution to thereby suppress residual water bottom energy. Another embodiment of program product can include a set of instructions that when executed cause a computer to operate to display quality control plots usable to spatially analyze the levels of residual water bottom energy in the data.

According to another embodiment of the program product, the operations can include those of applying a multi-domain deconvolution to seismic post-stack data to thereby suppress residual water bottom energy in a seismic data volume. This operation can correspondingly include using a combination of common water bottom times and sub-line numbers as an autocorrelation averaging reference for the multi-domain deconvolution to thereby suppress residual water bottom energy detection. In an embodiment of the program product, the operation can further include stacking seismic data into common depth point bins to form the three-dimensional stack data volume including a plurality of seismic traces, performing a plurality of autocorrelations on each of the plurality of stacked seismic traces, averaging the correlated data in a plurality of domains, determining a plurality of predictive deconvolution inverse operators responsive to the average correlated data in the plurality of domains, applying the predictive deconvolution inverse operators to the seismic data, and identifying water bottom energy present in the seismic data responsive to application of the predictive deconvolution inverse operators to the seismic data. The operations can also include displaying quality control plots to spatially analyze the levels of residual water bottom energy in the data.

Embodiments of the present invention can also include a computer readable medium that is readable by a computer to analyze seismic data. According to an example of an embodiment of the present invention, the computer readable medium can include a set of instructions that, when executed by a computer, cause the computer to perform the operations of applying a multi-domain deconvolution to seismic post-stack data to thereby suppress residual water bottom energy in a seismic data volume. This operation can include using a combination of common water bottom times and sub-line numbers as an autocorrelation averaging reference for the multi-domain deconvolution to thereby suppress residual water bottom energy detection. The operation can further include stacking seismic data into common depth point bins to form the three-dimensional stack data volume, performing a plurality of autocorrelations on each of a plurality of stacked seismic traces in the stacked data volume, averaging the correlated data in a plurality of domains, determining a plurality of predictive deconvolution inverse operators responsive to the average correlated data in the plurality of domains, applying the predictive deconvolution inverse operators to the seismic data, and identifying water bottom energy present in the seismic data responsive to application of the predictive deconvolution inverse operators to the seismic data. The operations can also include displaying quality control plots to spatially analyze the levels of residual water bottom energy in the data.

Various embodiments of the present invention differ from other industry processing techniques. For example, unlike predictive deconvolution in shot-receiver space which employs a method of gapped deconvolution based on multi-fold autocorrelations to address the water layer energy problem, various embodiments of the present invention do not use a pre-stack surface consistent method, much less one in the shot, receiver, common depth point, or offset domains. In addition, various embodiments of the present invention do not require the use the Split-Backus reverberation response to estimate reverberation times below each source and receiver. Rather, various embodiments of the present invention advantageously are in the post-stack, approximate zero-offset sub-surface domain using common sub-line combined with water bottom time, common sub-line alone, and/or common cross-line. The sub-line and cross-line are not the same as mid-point domain. Further, in an embodiment of the present invention, advantageously, the water layer time estimate comes from the water depth information recorded by the source boat navigation system.

Various embodiments of the present invention significantly differ from surface-consistent deconvolution (pre-stack multi-channel deconvolution) in that such embodiments, for example, address marine data and the nature of energy trapped in the water layer by using a combination of sub-surface references and water bottom time as a decomposition domain. Additionally, various embodiments of the present invention differ from a surface-consistent deconvolution in the Log/Fourier domain, as they do not assume a pre-stack surface consistent hypothesis in the source, receiver, structural and offset domains. Rather, various embodiments of the present invention operate in the post-stack sub-surface domains defined by a combination of sub-line and water bottom time, the sub-line, and the cross-line.

Various embodiments of the present invention also differ from deconvolution seismic filtering. For example, although such embodiments extract an auto-correlation from each seismic trace, the deconvolution operator is not derived from that same auto-correlation. Rather, it is derived after the auto-correlation is processed through an averaging technique followed by constructing a filter for each seismic trace based on a combination of auto-correlations representing the unique sub-line (or cross-line) and water bottom time for that trace location.

According to industry processing techniques, a multi-channel deconvolution is run pre-stack, while a single channel deconvolution is run post-stack. Typical pre-stack multi-channel deconvolution (also referred to as surface-consistent deconvolution) uses different sorting keys that normally are a combination of source, receiver, mid-point and offset. Advantageously, various embodiments of the present invention need not refer to the data with any of these keys. Further, advantageously, by using a post-stack multi-channel deconvolution, various embodiments of the present invention can take advantage of certain redundancies in the data to thereby expose the residual water bottom energy and to enhance suppression thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 5A is a graphical map of single trace autocorrelation amplitude at two-way water bottom time according to an embodiment of the present invention;

FIG. 5B is a graphical map of two-way water bottom time in milliseconds according to an embodiment of the present invention;

FIG. 7A is a graph of two-way water bottom line in milliseconds versus autocorrelation lag time in seconds to illustrate autocorrelation stack versus water bottom time of an entire study for the input data according to an embodiment of the present invention;

FIG. 7B is a graph of two-way water bottom line in milliseconds versus autocorrelation lag time in seconds to illustrate autocorrelation stack versus water bottom time of the entire study for the data after application of an embodiment of the residual water bottom energy suppression method according to an embodiment of the present invention;

FIG. 8A is a graphical map of autocorrelation amplitude at water bottom time before application of an embodiment of a suppression method according to an embodiment of the present invention;

FIG. 8B is a graphical map of autocorrelation amplitude at water bottom time after application of an embodiment of a suppression method according to an embodiment of the present invention;

FIG. 9A is a graph of two-way water bottom time in milliseconds versus autocorrelation lag time in seconds to illustrate autocorrelation stack versus water bottom time across an entire study area for the input data;

FIG. 9B is graph of two-way water bottom time in milliseconds versus autocorrelation lag time in seconds to illustrate autocorrelation stack versus water bottom time across the entire study area for the output data after application of an embodiment of a suppression method according to an embodiment of the present invention;

FIG. 9C is a graph of two-way water bottom time in milliseconds versus autocorrelation lag time in seconds to illustrate autocorrelation stack versus water bottom time across the entire study area for the output data using standard single trace gapped deconvolution;

FIG. 11A is the input section before application of an embodiment of a method for suppression of residual water bottom energy according to an embodiment of the present invention; and FIG. 11B is the output section after application of an embodiment of a method for suppression of residual water bottom energy according to an embodiment of the present invention.

DETAILED DESCRIPTION

Figure 1:
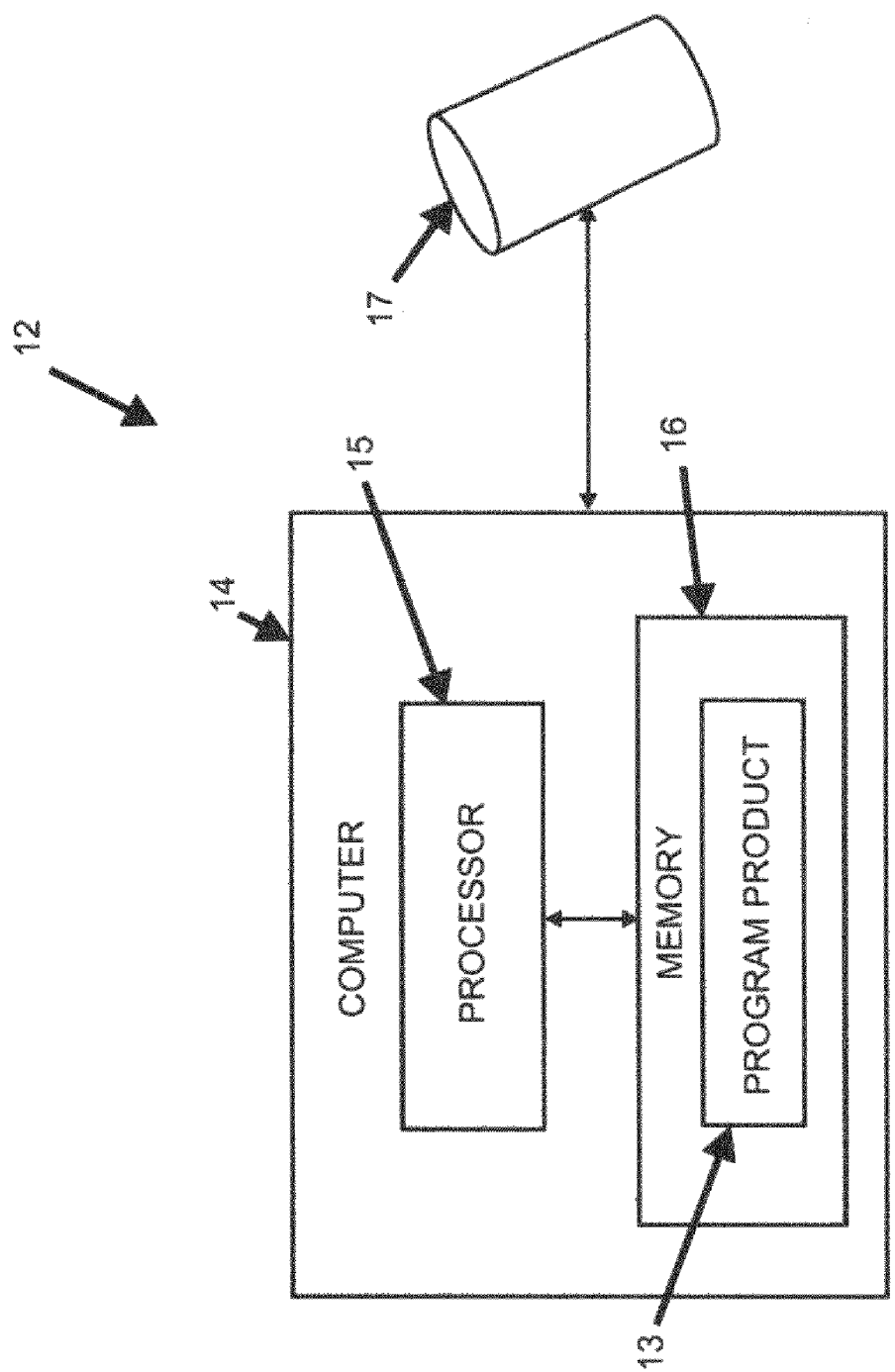
FIG. 1 is a schematic block diagram of a portion of a system for suppressing residual water bottom energy according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. Note, the term "Ghost Analysis and Termination" and acronym "GHOAT" as used herein are to be understood to be a short-handed reference to a process according to one or more embodiments of the present invention. The term "header" as used herein includes a storage location for data associated with a stacked seismic trace. The data may refer to numbers that reflect a seismic trace's location within a project or may refer to a value, such as water bottom time, that is associated with that specific trace location. Other trace data can be stored in the header.

FIGS. 1-11B illustrate an exemplary seismic data analysis system 12, seismic data analysis program product 13, and methods designed to efficiently find and suppress residual water bottom energy from seismic data volumes according to an exemplary embodiment of the present invention. As perhaps best shown in FIG. 1, the system 12 can include a seismic data analysis computer 14 having a processor 15 and memory 16 in communication with the processor 15 to store operating instructions therein and to store the seismic data analysis program product 13. The system 12 also includes a database 17 accessible to the processor 15 of the seismic data analysis computer 14 and having a plurality of data records including seismic data sets which can include both stack and unstacked seismic traces, each associated with and/or incorporating a header containing attributes of the respective seismic traces. Such header data for each seismic trace can include a sub-line number and cross-line number, and can include or be made to include two-way water bottom time, along with other variables or identifiers. The header data can also include or be made to include sub-surface reference horizon time. The system 12 can also include various input devices, displays, network connectivity devices, etc., (not shown) as known to those skilled in the art of computer systems. The system 12 can also include various devices known to those skilled in the art (not shown) to gather or otherwise generate the seismic data. For example, such data can be generated by recording reflection signals from a pair of sensors such as, for example, a hydrophone sensor and from a velocity phone, receiving reflected signals generated, e.g., from an ocean bottom cable.

Note, as also known and understood by those skilled in the art of computer systems, the memory 16 can include volatile and nonvolatile memory known to those skilled in the art including, for example, RAM, ROM, and magnetic or optical disks, just to name a few. Note, also, the seismic data analysis program product 13 can be in the form of microcode, programs, routines, and symbolic languages that provide a specific set or sets of ordered operations that control the functioning of the hardware and direct its operation, as known and understood by those skilled in the art. Note further, the seismic data analysis program product 13, according to an example of an embodiment of the present invention, need not reside in its entirety in volatile memory, but can be selectively loaded, as necessary, according to various methodologies as known and understood by those skilled in the art. Further, it should also be understood that the illustrated computer configuration is given by way of example and that other types of computers configured according to various other methodologies known to those skilled in the art, can be used. Computer 14, however, preferably takes the form of a desktop, laptop, or other semi-portable or portable computer as would be known to those skilled in the art of computer systems, rather than a large computer system, as is generally required by multi-channel industry techniques/methodologies which rely on pre-stack data.

Figure 3:
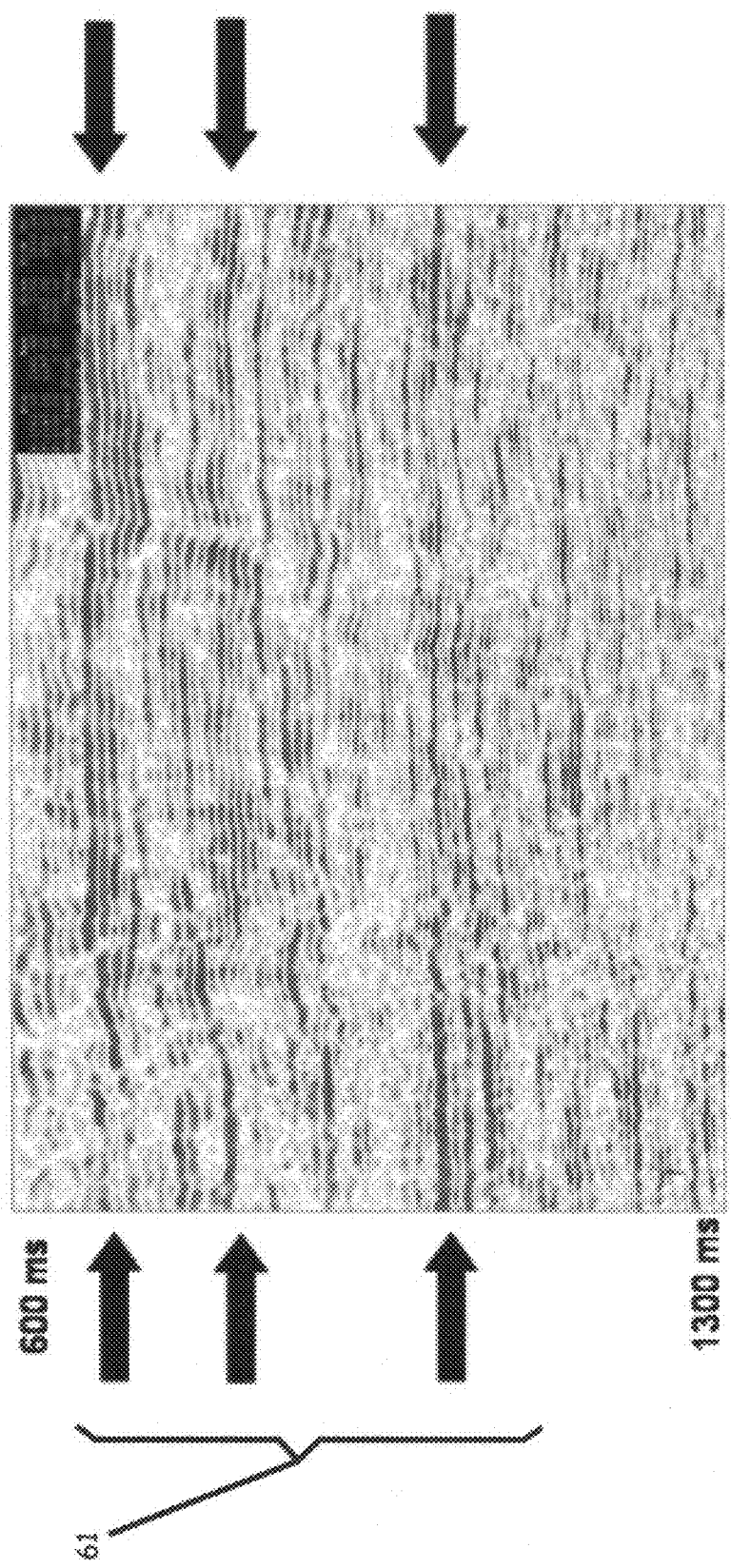
FIG. 3 is a graph of a two-way time versus common depth point vertical section extracted from input common depth point (CDP) 3D stack data illustrated prior to a method to suppress residual water bottom energy, according to an embodiment of the present invention.

The following exemplary embodiments of the present invention are described as applied to post-stack datasets. FIG. 3 is an example of a two-way time vertical section extracted from an input 3D stack volume. Opposing arrows 61 highlight events with poor resolution and high side lobes, probably due to the "ghost" effect of residual water bottom energy in the data. Various embodiments of the present invention uniquely combine multi-channel deconvolution with unique sorting keys to efficiently identify and suppress residual water bottom energy in common depth point (CDP) stacked seismic data. The first of, e.g., three, keys is a combination of seismic trace headers (e.g., common sub-line multiplied by 100 plus the common water bottom time in milliseconds) which efficiently isolates water bottom energy in an adaptable way across the project. The other two keys are subline and cross-line. Various embodiments of the present invention beneficially do not require use of a common mid-point as a sorting key. As will be described in more detail below, after deriving mean autocorrelations for each key, only two are typically subsequently used for deconvolution. These two keys include the combined common sub-line combined with common water bottom time term, and the common subline alone term.

Conventionally, multi-channel deconvolution is only run pre-CDP stack while single channel deconvolution is run post-stack. By using post-stack multi-channel deconvolution according to embodiments of the present invention, however, users may take advantage of certain redundancies in such post-stack data, which can be capitalized upon to expose the residual water bottom energy to be suppressed. As a result, it is now possible to efficiently and quickly isolate the periodicity and amplitude of this unwanted energy. Multi-domain deconvolution is utilized to suppress this errant energy while maintaining structural and wavelet integrity at the target horizon.

Figure 2:
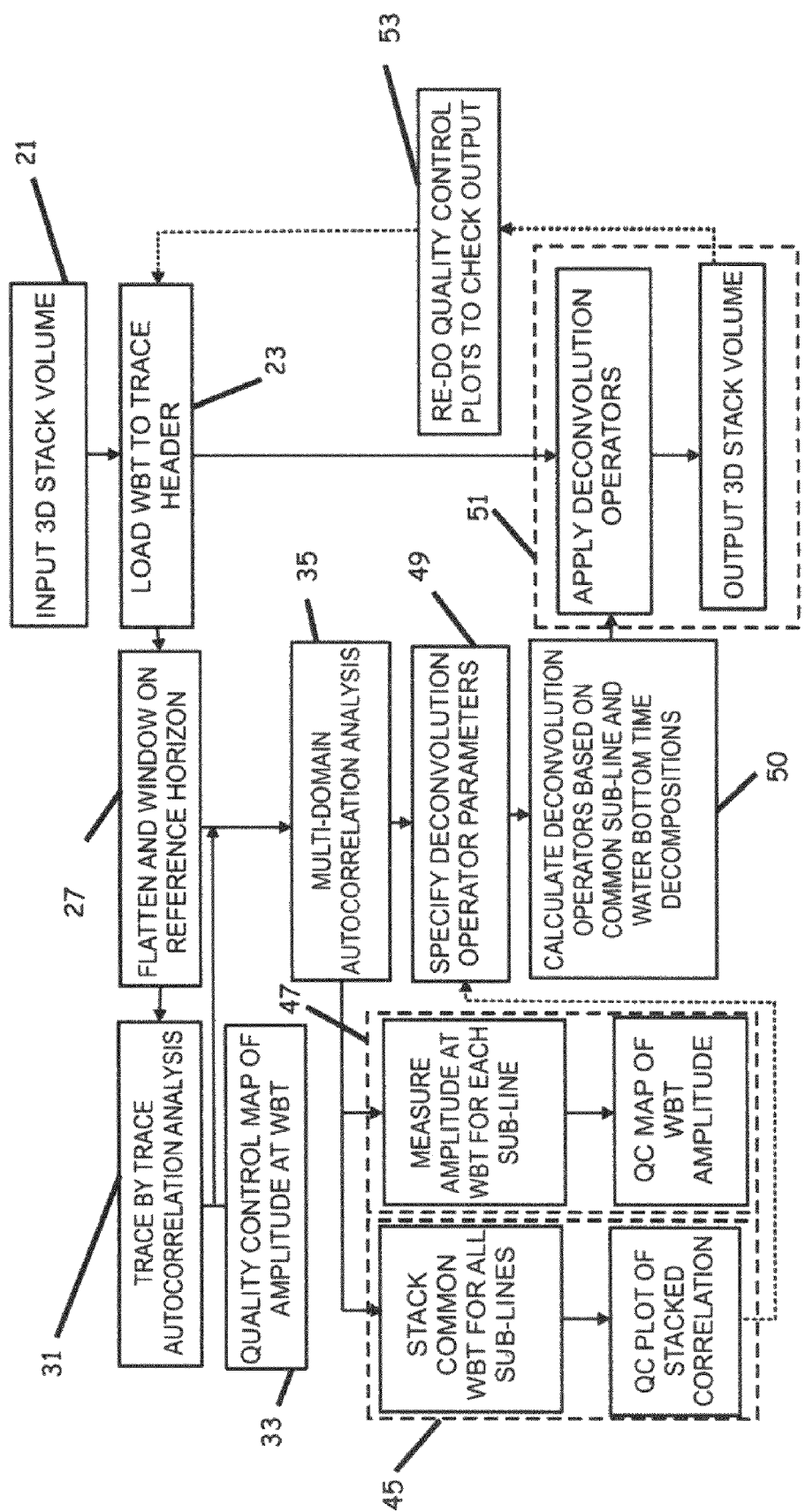
FIG. 2 is a block flow diagram of a process to suppress residual water bottom energy according to an embodiment of the present invention.

As perhaps best shown in FIG. 2, a ghost analysis and termination (GHOAT) methodology, according to an example of an embodiment of the present invention, is implemented as a series of steps and/or operations which can employ commercially available software programs and modules that are capable of being executed by computer systems known to those skilled in the art. An example of such software includes software named "Disco" available through Paradigm Geotechnology BV, having offices in Houston, Tex. Particularly, FIG. 2, illustrates a flow chart according to an example of an embodiment of a method, program product, and system of the present invention to suppress residual water bottom energy, and can employ the following steps:

At block 21, the computer 14 (or other analyzer) reads in stack volume (e.g., three-dimensional) with sub-line and cross-line numbers in the header, and as either a continuous step or as they separate step performed later, the computer 14 reads in a sub-surface reference horizon time for each trace and stores it in the header. At block 23, the computer 14 reads in/loads two-way water bottom time for each trace and places it in the header. At block 27, the seismic data is flattened so the reference horizon is positioned at a constant time for all traces in the volume, and a time window is extracted from the flattened seismic volume.

At block 31, once the seismic data has been stacked into common depth point bins, autocorrelations are computed from the extracted time window for each trace in the volume. Note, the steps/operations can also include creating dummy shot point and receiver point headers from sub-line and cross-line headers, and creating a dummy offset header from common sub-line number and common water bottom time.

At block 33, the autocorrelation amplitude level is measured on each trace at the two-way water bottom time and the value is plotted in color as a quality control map with sub-line on vertical axis and cross-line on the horizontal axis. FIG. 5A provides an example of this plot. Note, the large variation in water bottom amplitude corresponds to changes in water bottom time shown in FIG. 5B, which provides an indication that the dual sensors have not efficiently suppressed the water bottom energy.

At block 35, mean autocorrelations are derived using the output of the autocorrelation analysis at block 33 and/or dummy shot point and receiver point headers and the dummy offset header. Autocorrelations from each stacked trace are gathered and averaged in a plurality of domains, which allow the user to efficiently identify water bottom energy that may be present in the data. E.g., three, mean datasets/domains in which the autocorrelations are decomposed, can be output based on seismic trace headers. These mean datasets/domains are defined, for example, as (1) common sub-line number multiplied by 100 plus the common water bottom time in milliseconds, (2) common sub-line number, and (3) common cross-line number. That is, the autocorrelation gathers are formed according to the sub-steps of calculating the mean autocorrelations which have the same (1) common sub-line number multiplied by 100 plus the common water bottom time in milliseconds, (2) common sub-line number and (3) common cross-line number. Assuming these three "terms" are convolutional, the input can be represented by a linear combination of the three terms in the log spectra domain with each term finally derived by least squares error minimization. The three-term autocorrelation solution, according to an embodiment of the present invention, has been found to result in a more efficient identification of the residual water bottom energy, over that of the state-of-the-art. The mean autocorrelations are saved to disk.

As indicated at blocks 49, 50, and 51, after deriving mean autocorrelations for each domain/key, e.g., two or more of the "terms" or "keys" can be subsequently used for deconvolution: (1) the combined sub-line with water bottom time term; and (2) the sub-line only term, for example. This type of deconvolution is referred to as sub-surface consistent deconvolution.

Figure 4:
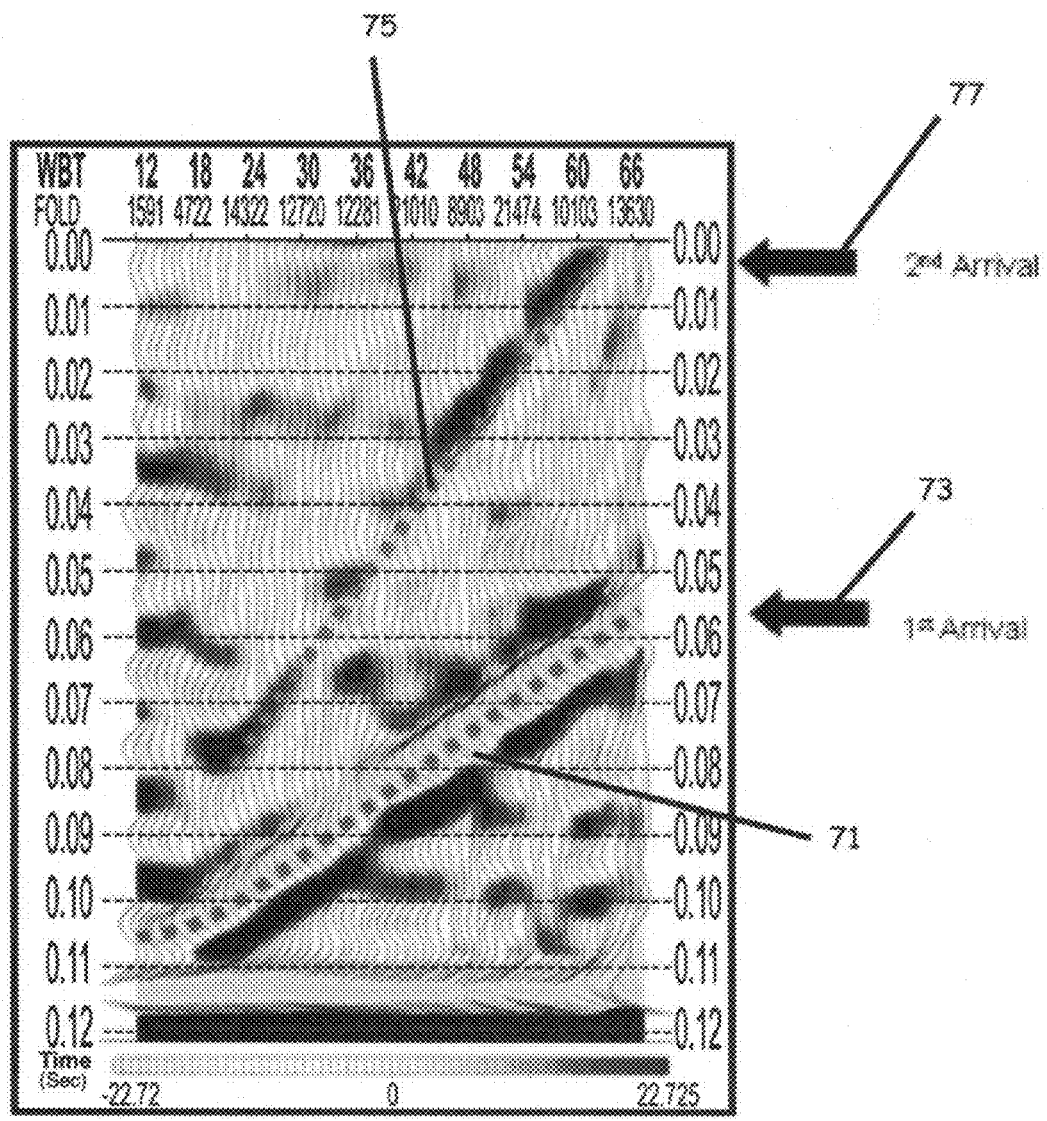
FIG. 4 is graph of two-way water bottom time in milliseconds versus autocorrelation time in seconds to illustrate an autocorrelation stack of common water bottom time for all sub-lines according to an embodiment of the present invention.

At block 45, using the mean autocorrelations from part/sub-step (1) of the step identified at block 35, the data is stacked into common water bottom time bins, and the results are displayed in trace format as a quality control plot. FIG. 4 provides an example of an autocorrelation analysis formed by summing single fold auto-correlations into common water bottom time bins (e.g., for the entire survey). First and second arrivals of unwanted water bottom energy are clearly visible, as indicated by dashed lines 71, 75, and arrows 73, 77. Normally these levels of water bottom energy are not expected to be so detectable just above the zone of interest. Here, the zero lag time of the autocorrelation is displayed at 0.12 seconds. Quality control plots using the combined sub-line with water bottom time key can demonstrate the redundancy advantage of these keys or domains.

Figure 6A:
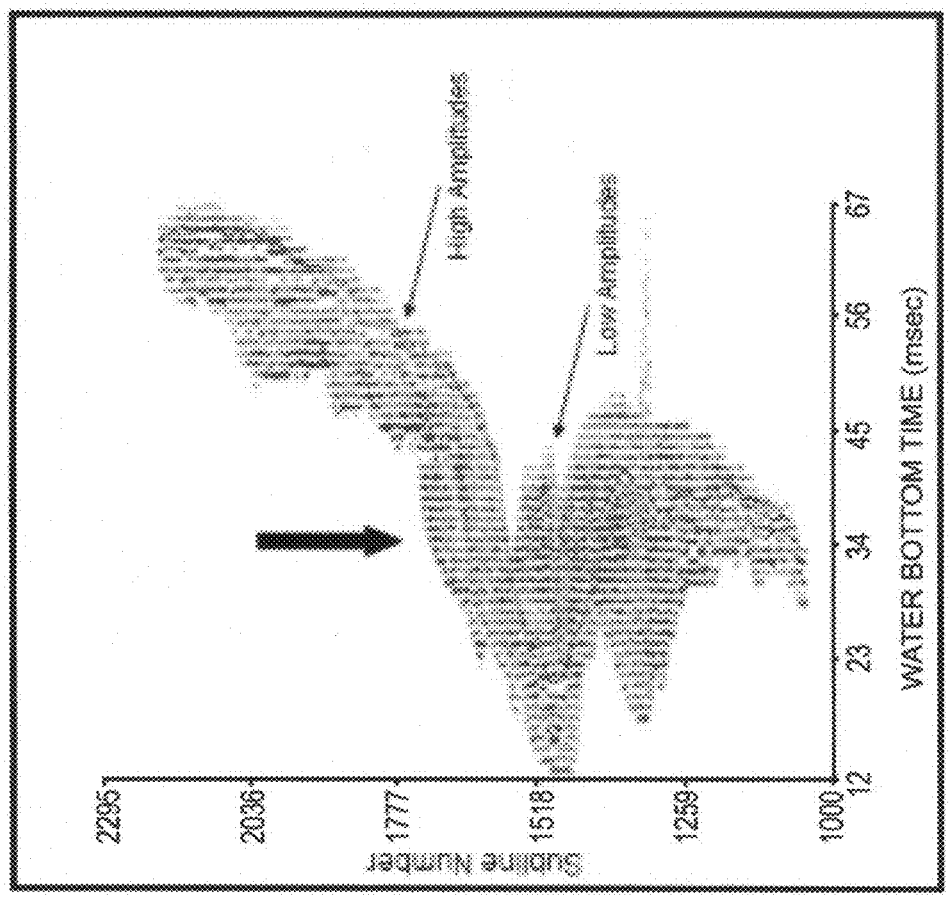
FIG. 6A is a quality control graph of sub-line position versus two-way water bottom time in milliseconds to illustrate autocorrelation stack amplitude at common water bottom time for each sub-line in the study area according to an embodiment of the present invention.
Figure 6B:
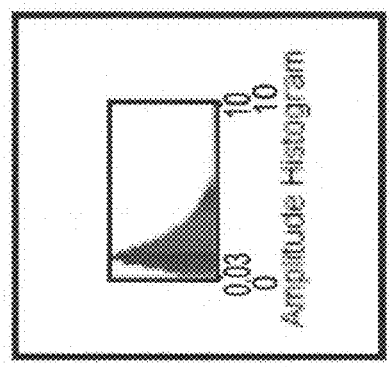
FIG. 6B is an amplitude histogram of the plotted values in FIG. 6A according to an embodiment of the present invention.

At block 47, the autocorrelations from part/sub-step (1) of the step identified at block 35 are measured for an amplitude value at the time sample, which corresponds, for example, to the two-way water bottom time. The results are plotted in color as a quality control map with sub-line on one axis (e.g., the Y axis) and common water bottom time on the other (e.g., the X axis). FIG. 6A provides an example of this plot, which illustrates variable amplitude across sub-lines for a common water bottom time (arrow), indicating a spatially variable deconvolution operator is required. FIGS. 6A-B are useful for showing the spatial distribution of the same residual energy across a survey.

At blocks 49 and 50, for each trace in the stack volume, two mean autocorrelations from parts/sub-steps (1) and (2) of the step identified at block 35 (i.e., common sub-line and water bottom time decompositions) can be used as inputs to a predictive deconvolution (e.g., Weiner-Levinson) algorithm to obtain two causal inverse filters to apply for each trace. Also, plots from step identified at block 45 can be used to determine/specify length and gap operator parameters. At block 51, the operators calculated at the step identified at block 49 can be applied to the subsurface reference horizon time for each trace and the output three-dimensional stack volume can be saved to disk. At block 53, using the three-dimensional stack volume output from block 51, the steps identified with respect to blocks 27 through 49 can be repeated to evaluate the effectiveness of the application of the deconvolution operators identified at block 51. If necessary, the operator design parameters identified at block 49 can be changed (re-specified) and the step identified at block 51 can be re-run.

As noted previously, according to the state-of-the-art, multi-channel deconvolution is exclusively run before or pre-common depth point (CDP) stack, while single-channel deconvolution is run post-stack. By instead using post-stack multi-channel deconvolution, according to various embodiments of the present invention, it has been found that such methodology beneficially identifies certain redundancies in the data, which can be capitalized upon to more completely expose the residual water bottom energy intended to be suppressed, without the need for extensive resources. The stacked autocorrelation representing common sub-line, e.g., multiplied by 100, plus the common water bottom time, e.g., in milliseconds, can be plotted in several ways to observe amplitude levels in a spatial manner across the survey. Further, the above described quality control plots based on autocorrelation decompositions allow visualization of water bottom energy in useful ways. These plots can aid the design of predictive deconvolution inverse operators.

After applying the operators, the plots can be regenerated to see how efficiently the process has worked. For example, FIGS. 7A and 7B illustrate the before and after comparison of autocorrelation stack versus water bottom time of the entire study for the data. FIG. 7A is prior to the application of an embodiment of a process for suppression of bottom water energy discussed with respect to FIG. 4. Whereas, FIG. 7B is after the application of an embodiment of a process for suppression of bottom water energy according to an embodiment of the present invention. As the arrows 91, 93, indicate, the first and second water bottom arrivals are efficiently suppressed.

FIGS. 8A and 8B are graphs of autocorrelation amplitude at water bottom time. FIG. 8A is before application of an embodiment of a suppression method, whereas FIG. 8B is a map of autocorrelation amplitude at water bottom time after application of an embodiment of a suppression method. Note, the illustrated embodiment of the present invention, through suppression, has equalized the unwanted energy across the study area (see respective histograms) with the exception of the most shallow times (arrow 101), where the interference with the background seismic wavelet causes a tuning effect.

FIGS. 9A, 9B, and 9C are comparisons of autocorrelation stack versus water bottom time across the entire study area for the seismic data. The horizontal axis is two-way water bottom time in milliseconds increasing to the right. The vertical axis is autocorrelation lag time in seconds increasing from bottom to top. The panels are display-normalized to have the same trace deflection for the largest zero lag value of each panel. FIG. 9A is a comparison using the input data. FIG. 9B is a comparison using the data after application of an embodiment of a suppression process. FIG. 9C is a comparison using data with standard single trace gapped deconvolution. Note, the various embodiments of a residual water bottom suppression process (see, e.g., FIG. 9B) is substantial more efficient at attenuating the water bottom energy, as identified by the arrow 111 shown in FIG. 9C.

Figure 10:
FIG. 10 is a graph of output two-way time vertical section after application of an embodiment of a residual water bottom energy suppression method according to an embodiment of the present invention.

FIG. 10 illustrates the output two-way time vertical section, introduced in FIG. 3, after application of an embodiment of residual water bottom energy suppression. Note, the illustrated opposing arrows 61' highlight events with improved resolution and low side lobe energy.

FIGS. 11A and 11B further illustrate the improved resolution and low side lobe energy due to application of an embodiment of residual water bottom energy suppression method. That is, FIG. 11A provides an example of the input section before application of an embodiment of a method for suppression of residual water bottom energy. In comparison, FIG. 11B provides an example of the output section after application of an embodiment of method for suppression of residual water bottom energy.

The various data plots according to embodiments of the present invention beneficially provide a higher level of confidence to the interpreter of the seismic data as they clearly represent the final levels of residual water bottom energy spatially across the survey, allowing him or her to determine if observed amplitude changes are due to residual water bottom energy or to important features of the reservoir.

In summary, by using a combination of common water bottom times and sub-line numbers as an autocorrelation averaging reference for the multi-domain deconvolution, along with novel quality control plots, a more efficient suppression of residual water bottom energy as compared to standard single channel deconvolution used for post-stack data, can be demonstrated. Besides effectively identifying residual multiple energy, various embodiments of the methods have proved to be exceptionally cost effective, as only stacked data is required. Desktop workstations, rather than much larger systems, can easily implement various embodiments of the methods. By comparison, most multi-channel industry methods rely on pre-stack data, which can only be managed with enormous computer systems.

As will be understood by one of ordinary skill in the art, the comparative results presented in FIGS. 7A-11B developed from an embodiment of a system, program product, and method of the invention, produce displays that are significant improvements and illustrate that residual water bottom energy has been efficiently and effectively suppressed. An embodiment of a method of the present invention can advantageously be practiced with existing software programs with minor modification, and by assembling the required software modules, can utilize utilities from seismic data processing software libraries that are commercially available. Suitable seismic processing modules for use in various embodiments of the present invention are available from commercial software suppliers such as, for example, Disco available through Paradigm Geotechnology BV, having offices in Houston, Tex.

An embodiment of a method of suppressing residual water bottom energy detection in seismic data, for example, can include: (a) reading in stacked seismic data with cross-line and sub-line numbers in the header, (b) reading in two-way water bottom time for each trace and placing it in the header, (c) reading a sub-surface horizon time for each trace and storing it in the header, (d) flattening the seismic data so the reference horizon is positioned at a constant time for all traces in the volume, (e) extracting a time window from the flattened seismic volume, (f) computing autocorrelations from the extracted time window for each trace in the volume, (g) measuring the autocorrelation amplitude level on each trace at the two way water bottom time and plotting the value as a quality control map, and (h) deriving mean autocorrelations using the output from step (f). Step (h) can include developing, e.g., three datasets. These three mean datasets can be output based on trace headers defined, for example, as (1) common sub-line multiplied by 100 plus the common water bottom time in milliseconds, (2) common sub-line number and (3) common cross-line number.

The method can also include: (i) saving the mean autocorrelations to disk, (j) using the mean autocorrelations from part 1 of step (h) to stack the data into common water bottom time bins and display the result in trace format as a quality control plot, (k) measuring the autocorrelations from part (1) of step (h) for an amplitude value at the time sample which corresponds to the two way water bottom time and plotting the results as a quality control map, (l) obtaining two causal inverse filters to apply to each trace in the stack volume, (m) applying the operators from step (l) to the data from step (c) and saving the output to disk, (n) using the output from step (m), repeating steps (d) through (k) to evaluate the effectiveness of step (m), and (o) changing the operator design parameters in step (l) and re-running step (m) if desired.

For seismic data having stacked three-dimensional seismic data, step (h) can include three mean data sets being output based on trace headers defined as (1) common sub-line multiplied by 100 plus the common water bottom time in milliseconds, (2) the common sub-line number, and (3) common cross-line number, and step (l) can include using two mean autocorrelations from parts (1) and (2) in step (h) as input to a standard predictive deconvolution algorithm and using the plots from step (j) to determine length and gap parameters for an operator.

An example of an embodiment a method of suppressing residual water bottom energy in seismic data can include using a combination of common water bottom times and sub-line numbers as an autocorrelation averaging reference for multi-domain deconvolution to thereby suppress residual water bottom energy detection. Another example of an embodiment of a method includes using quality control plots to spatially analyze the levels of residual water bottom energy in the data.

Embodiments of program product stored in tangible computer-readable memory, readable by a computer, are provided. The program product, according to an example of an embodiment of the present invention, can include a set of instructions so that when read by a computer, cause the computer to perform the operation of using a combination of common water bottom times and sub-line numbers as an autocorrelation averaging reference for multi-domain deconvolution to thereby suppress residual water bottom energy detection. Another example of an embodiment of program product includes a set of instructions which cause the computer to perform the operation of producing and displaying quality control plots to spatially analyze the levels of residual water bottom energy in the data.

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that the embodiments of the present invention apply equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the system software, seismic data analysis program product 13 and the method and process steps, described above.

This application is related to U.S. Provisional Application No. 61/032,637 by Burnstad et al., filed Feb. 29, 2008, titled "Method, Program, Product, and System for Suppression of Residual Water Bottom Energy in Surface Seismic Data," and U.S. Provisional Application No. 61/033,012 by Burnstadt et al., filed on Mar. 2, 2008, titled "Method, Program, Product, and System for Suppression of Residual Water Bottom Energy in Surface Seismic Data," each incorporated by reference in its entirety.

The following references are each incorporated by reference, herein, each in its entirety:

Morley, L. and Claerbout, J. (May 1983) Predictive Evolution in Shot-Receiver Space; Geophysics, 48, pp. 515-531.

Levin, S. A. (September 1989) Surface-Consistent Deconvolution; Geophysics, 54, pp. 1123-1133.

Cambois, G. and Stoffaa, P. (August 1993) Surface-Consistent Phase Decomposition in the Log/Fourier Domain; Geophysics, 58, pp. 1099-1111.

Duren, U.S. Pat. No. 6,678,207, titled "Trapped Water Bottom Multiple and Peg-Laden Multiple Suppression for Ocean Bottom Seismic Data."

Burg, U.S. Pat. No. 3,512,127, titled "Deconvolution Seismic Filtering."

Dobrin et al., U.S. Pat. No. 3,370,268, titled "Method of Processing Geological and Geophysical Data."

Starr, U.S. Pat. No. 6,263,285, titled "Amplitude Spectra Estimation."

Starr, U.S. Pat. No. 6,151,275, titled "Method of Dual Wavefield Reinforcement."

Starr, U.S. Pat. No. 6,026,059, titled "Method of Creating Common-Offset/Common-Azimuth Gathers in 3-D Seismic Surveys and Method of Conducting Reflection Attribute Variation Analysis."

McCormick et al., U.S. Pat. No. 6,154,705, titled "System for Attenuating High Order Free Surface Multiples from a Seismic Shot Record Using a Genetic Procedure."

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer implemented method of suppressing residual water bottom energy in seismic data, the method comprising the steps of:

obtaining common depth point stacked three-dimensional seismic data defining a post-stack data volume, the post-stack data volume comprising a plurality of seismic traces, each seismic trace including a header including cross-line and sub-line numbers;

obtaining two-way water bottom time data for each of the plurality of seismic traces;

storing the respective two-way water bottom time data obtained for each of the plurality of seismic traces in the respective header;

obtaining a sub-surface horizon time data for each of the plurality of seismic traces;

storing the respective sub-surface horizon time data obtained for each of the plurality of seismic traces in the respective header;

flattening the stacked seismic data defining a flattened seismic data volume so that a reference horizon is positioned at a constant time for each of the plurality of traces in the post-stack data volume;

extracting a time window from the flattened seismic data volume;

computing an autocorrelation, by a computer, for each separate one of the plurality of seismic traces in the volume responsive to the respective extracted time window for the respective seismic trace in the volume;

performing a multi-domain autocorrelation analysis, by the computer, on a plurality of different domains responsive to the plurality of autocorrelations;

applying a multi-domain deconvolution to the post-stack seismic data, by the computer, using terms derived from at least two of the plurality of different domains to thereby identify and suppress the residual water bottom energy; and providing seismic data providing an improved resolution responsive to suppression of the residual water bottom energy from within the post-stack seismic data.

2. A method as defined in claim 1, wherein the step of performing a multi-domain autocorrelation analysis, includes:

deriving a plurality of mean autocorrelations responsive to the plurality of autocorrelations, the deriving including determining a mean value for each of the plurality of autocorrelations in each of a plurality of different domains.

3. A method as defined in claim 2, wherein the step of determining a mean value for each of the plurality of autocorrelations in each of a plurality of different domains includes:

outputting three mean data sets responsive to header data for each of the plurality of seismic traces, the data sets comprising: (1) common sub-line number and common water bottom time, (2) the common sub-line number, and (3) a common cross-line number.

4. A method as defined in claim 2, further comprising the steps of:

stacking the post-stack seismic data into common water bottom time bins responsive to at least one of the plurality of derived mean autocorrelations; and displaying a quality control map of the post-stack seismic data in trace format responsive to the step of stacking the post-stack seismic data into common water bottom time bins.

5. A method as defined in claim 4, wherein the step of applying a multi-domain deconvolution to the post-stack seismic data, includes:

receiving deconvolution operator parameters responsive to the quality control map of the post-stack seismic data in trace format;

obtaining two causal inverse filters to determine one or more deconvolution operators to apply to each of the plurality of seismic traces in the post-stack data volume responsive to at least two of the plurality of derived mean autocorrelations and the deconvolution operator parameters; and applying the deconvolution operators to the sub-surface horizon time data for each of the plurality of seismic traces.

6. A method as defined in claim 1, further comprising the step of:

obtaining two causal inverse filters to apply to each of the plurality of seismic traces in the post-slack data volume using two derived mean autocorrelations as input to a predictive deconvolution algorithm, the two mean autocorrelations each for a different data set, the data sets including (1) common sub-line number and common water bottom time, and (2) the common sub-line number.

7. A method as defined in claim 1, further comprising the steps of:

measuring an autocorrelation amplitude level for each of the plurality of seismic traces at the two-way water bottom time to define water bottom time amplitude; and displaying a quality control map of the water bottom time amplitude for each of the plurality of seismic traces on a computer display.

8. A method as defined in claim 1, further comprising the steps of:

determining an amplitude value of derived mean autocorrelations at a time sample corresponding to the two-way water bottom time for at least one of the plurality of different domains responsive to at least one of the plurality of derived mean autocorrelations; and displaying a quality control map of the derived mean autocorrelation amplitude values at two-way water bottom time.

9. A computer implemented method of suppressing residual water bottom energy in seismic data, the method comprising the steps of:

obtaining post-stack seismic data;

performing a multi-domain autocorrelation analysis, by a computer, on a plurality of different domains;

responsive to the multi-domain autocorrelation analysis, applying a multi-domain deconvolution to the post-stack seismic data, by the computer, using terms derived from at least two of the plurality of different domains to thereby identify residual water bottom energy present in the seismic data;

suppressing residual water bottom energy in a seismic data volume responsive to the identification of the residual water bottom energy present in the post-stack seismic data; and providing seismic data providing an improved resolution responsive to suppression of the residual water bottom energy from within the post-stack seismic data.

10. A method as defined in claim 9, wherein the step of applying a multi-domain deconvolution to the post-stack seismic data includes using a combination of common water bottom times and sub-line numbers as an autocorrelation averaging reference for the multi-domain deconvolution.

11. A method as defined in claim 9, wherein the post-stack seismic data comprises a three-dimensional stack data volume including a plurality of seismic traces further comprising the steps of:

accessing the stacked seismic data;

accessing two-way water bottom time for each seismic trace;

accessing a sub-surface horizon time for each seismic trace;

flattening the seismic data to form a reference horizon positioned at a constant time for each seismic trace in the volume; and extracting a time window from the flattened seismic volume.

12. A method as defined in claim 11, further comprising the steps of:

computing an autocorrelation from the extracted time window for each of the plurality of seismic traces in the seismic data volume;

measuring the autocorrelation amplitude level on each seismic trace at the two-way water bottom time; and plotting the amplitude level values as a quality control map.

13. A method as defined in claim 11, further comprising the step of:

computing an autocorrelation for each of the plurality of seismic traces in the seismic data volume responsive to the extracted time window; and wherein the step of applying a multi-domain deconvolution to the post-stack seismic data includes the step of averaging the computed autocorrelations in a plurality of domains to thereby identify water bottom energy present in the post-stack seismic data.

14. A method as defined in claim 13, wherein the stacked seismic data is stored in data records each having a header containing cross-line and sub-line numbers, and wherein the step of averaging the computed autocorrelations in a plurality of domains includes the steps of:
  calculating a first mean autocorrelation having a common sub-line and a common water bottom time;
  calculating a second mean autocorrelation having a common sub-line number; and
  calculating a third mean autocorrelation having a common cross-line number.

15. A method as defined in claim 14, wherein the step of applying a multi-domain deconvolution to the post-stack seismic data further includes the steps of:
  stacking the seismic data into common water bottom time bins for each sub-line number responsive to the calculated first mean autocorrelation;
  displaying the autocorrelation stack of common water bottom time for each sub-line number;
  determining an amplitude value of the seismic data at common water bottom time for each sub-line number; and
  displaying the amplitude values of the seismic data at common water bottom time for each sub-line number.

16. A method as defined in claim 14, wherein the step of applying a multi-domain deconvolution to the post-stack seismic data further includes the steps of:
  applying a predictive deconvolution algorithm to obtain a plurality of causal inverse filters defining a plurality of operators to apply to each of the plurality of seismic traces in the seismic stack volume responsive to the first and the second mean autocorrelations; and
  applying the plurality of operators to each of the plurality of seismic traces to thereby suppress residual water bottom energy in a seismic data volume.

17. A method as defined in claim 16, wherein the step of applying a multi-domain deconvolution to the post-stack seismic data further includes the steps of:
  stacking the seismic data into common water bottom time bins for each sub-line number responsive to the calculated first mean autocorrelation;
  determining an amplitude value of the seismic data at common water bottom time for each sub-line number;
  displaying the amplitude values of the seismic data at common water bottom time for each sub-line number;
  determining a need for a spatially variable deconvolution operator responsive to the displayed amplitude values;
  stacking the seismic data into common water bottom time bins for each sub-line number responsive to the calculated first mean autocorrelation;
  displaying the autocorrelation stack of common water bottom time for each sub-line number; and
  determining tenth and gap parameters for the plurality of operators responsive to the displayed autocorrelation stack of common water bottom time for each sub-line number.

18. A method as defined in claim 9, further comprising the steps of:
  stacking seismic data into common depth point bins to form the three-dimensional stack data volume, the stacked seismic data comprising a plurality of seismic traces;
  performing a plurality of autocorrelations on each of the plurality of stacked seismic traces;
  averaging the correlated data in a plurality of domains;
  applying the multi-domain deconvolution to the post-stack seismic data using terms derived from at least two of the plurality of domains, to include:
    determining a plurality of predictive deconvolution inverse operators responsive to the average correlated data in the plurality of domains, and
    applying the predictive deconvolution inverse operators to the post-stack seismic data; and
  identifying water bottom energy present in the post-stack seismic data responsive to application of the predictive deconvolution inverse operators to the post-stack seismic data.

19. Seismic data analysis program product to suppress residual water bottom energy in seismic data, stored on a non-transitory computer medium that is readable by a computer, the program product comprising a set of instructions that, when executed by the computer, cause the computer to perform the operations of:
  obtaining common depth point stacked three-dimensional seismic data defining a post-stack data volume, the post-stack data volume comprising a plurality of seismic traces, each seismic trace including a header including cross-line and sub-line numbers;
  obtaining two-way water bottom time data for each of the plurality of seismic traces;
  obtaining a sub-surface horizon time data for each of the plurality of seismic traces;
  flattening the stacked seismic data defining a flattened seismic data volume so that a reference horizon is positioned at a constant time for each of the plurality of traces in the post-stack data volume;
  extracting a time window from the flattened seismic data volume;
  computing an autocorrelation for each separate one of the plurality of seismic traces in the volume responsive to the respective extracted time window for the respective seismic trace in the volume;
  performing a multi-domain autocorrelation analysis on a plurality of different domains responsive to the plurality of autocorrelations;
  applying a multi-domain deconvolution to the post-stack seismic data using terms derived from at least two of the plurality of different domains to thereby identify and suppress the residual water bottom energy; and
  providing seismic data providing an improved resolution responsive to suppression of the residual water bottom energy.

20. Program product as defined in claim 19, wherein the operation of performing multi-domain autocorrelation analysis, includes:
  deriving a plurality of mean autocorrelations responsive to the plurality of autocorrelations, the deriving including determining a mean value for each of the plurality of autocorrelations in each of a plurality of different domains.

21. Program product as defined in claim 20, wherein the operation of determining a mean value for each of the plurality of autocorrelations in each of a plurality of different domains includes:
  outputting three mean data sets responsive to header data for each of the plurality of seismic traces, the data sets comprising: (1) common sub-line number and common water bottom time, (2) the common sub-line number, and (3) a common cross-line number.

22. Program product as defined in claim 20, wherein the operations further comprise:

stacking the post-stack seismic data into common water bottom time bins responsive to at least one of the plurality of derived mean autocorrelations; and displaying a quality control map of the post-stack seismic data in trace format responsive to the operation of stacking the post-stack seismic data into common water bottom time bins.

23. Program product as defined in claim 22, wherein the operation of applying a multi-domain deconvolution to the post-stack seismic data, includes:

receiving deconvolution operator parameters responsive to the quality control map of the post-stack seismic data in trace format;

obtaining two causal inverse filters to determine one or more deconvolution operators to apply to each of the plurality of seismic traces in the post-stack data volume responsive to at least two of the plurality of derived mean autocorrelations and the deconvolution operator parameters; and applying the deconvolution operators to the sub-surface horizon time data for each of the plurality of seismic traces.

24. Program product as defined in claim 19, wherein the operations further comprise:

obtaining two causal inverse filters to apply to each of the plurality of seismic traces in the post-stack data volume using two derived mean autocorrelations as input to a predictive deconvolution algorithm, the two mean autocorrelations each for a different data set, the data sets including (1) common sub-line number and common water bottom time, and (2) the common sub-line number.

25. Program product as defined in claim 19, wherein the operations further comprise:

measuring an autocorrelation amplitude level for each of the plurality of seismic traces at the two-way water bottom time to define water bottom time amplitude; and displaying a quality control map of the water bottom time amplitude for each of the plurality of seismic traces on a computer display.

26. Program product as defined in claim 19, wherein the operations further comprise:

determining an amplitude value of derived mean autocorrelations at a time sample corresponding to the two-way water bottom time for at least one of the plurality of different domains responsive to at least one of the plurality of derived mean autocorrelations; and displaying a quality control map of the derived mean autocorrelation amplitude values at two-way water bottom time.

27. Seismic data analysis program product to suppress residual water bottom energy in seismic data, stored on a non-transitory computer readable medium that is readable by a computer, the program product comprising a set of instructions that, when executed by the computer, cause the computer to perform the operations of:

obtaining post-stack seismic data;

performing a multi-domain autocorrelation analysis on a plurality of different domains:

responsive to the multi-domain autocorrelation analysis, applying a multi-domain deconvolution to the post-stack seismic data terms derived from at least two of the plurality of different domains to thereby identify residual water bottom energy present in the post-stack seismic data;

suppressing residual water bottom energy in a seismic data volume responsive to the identification of the residual water bottom energy present in the seismic post-stack data; and providing seismic data providing an improved resolution responsive to suppression of the residual water bottom energy.

28. Program product as defined in claim 27, wherein the operation of applying a multi-domain deconvolution to the post-stack seismic data includes using a combination of common water bottom times and sub-line numbers as an autocorrelation averaging reference for the multi-domain deconvolution.

29. Program product as defined in claim 27, wherein the post-stack seismic data comprises a three-dimensional stack data volume including a plurality of seismic traces wherein the operations further comprise:

accessing the stacked seismic data;

accessing two-way, water bottom time for each seismic trace;

accessing a sub-surface horizon time for each seismic trace;

flattening the seismic data to form a reference horizon positioned at a constant time for each seismic trace in the volume; and extracting a time window from the flattened seismic volume.

30. Program product as defined in claim 29, wherein the operations further comprise:

computing an autocorrelation from the extracted time window for each of the plurality of seismic traces in the seismic data volume;

measuring the autocorrelation amplitude level on each seismic trace at the two-way water bottom time; and plotting the amplitude level values as a quality control map.

31. Program product as defined in claim 29, wherein the operations further comprise:

computing an autocorrelation for each of the plurality of seismic traces in the seismic data volume responsive to the extracted time window; and wherein the operation of applying a multi-domain deconvolution to the post-stack seismic data includes the operation of averaging the computed autocorrelations in a plurality of domains to thereby identify water bottom energy present in the seismic data.

32. Program product as defined in claim 31, wherein the stacked seismic data is stored in data records each having a header containing cross-line and sub-line numbers, and wherein the operation of averaging the computed autocorrelations in a plurality of domains includes the operations of:

calculating a first mean autocorrelation having a common sub-line and a common water bottom time;

calculating a second mean autocorrelation having a common sub-line number; and calculating a third mean autocorrelation having a common cross-line number.

33. Program product as defined in claim 32, wherein the operation of applying a multi-domain deconvolution to the post-stack seismic data further includes the operations of:

stacking the seismic data into common water bottom time bins for each sub-line number responsive to the calculated first mean autocorrelation;

displaying the autocorrelation stack of common water bottom time for each sub-line number;

determining an amplitude value of the seismic data at common water bottom time for each sub-line number; and displaying the amplitude values of the seismic data at common water bottom time for each sub-line number.

34. Program product as defined in claim 32, wherein the operation of applying a multi-domain deconvolution to seismic post-stack seismic data further includes the operations of:
applying a predictive deconvolution algorithm to obtain a plurality of causal inverse filters defining a plurality of operators to apply to each of the plurality of seismic traces in the seismic stack volume responsive to the first and the second mean autocorrelations; and
applying the plurality of operators to each of the plurality of seismic traces to thereby suppress residual water bottom energy in a seismic data volume.

35. Program product as defined in claim 34, wherein the operation of applying a multi-domain deconvolution to the post-stack seismic data further includes the operations of:
stacking the seismic data into common water bottom time bins for each sub-line number responsive to the calculated first mean autocorrelation;
determining an amplitude value of the seismic data at common water bottom time for each sub-line number;
displaying the amplitude values of the seismic data at common water bottom time for each sub-line number;
determining a need for a spatially variable deconvolution operator responsive to the displayed amplitude values;
stacking the seismic data into common water bottom time bins for each sub-line number responsive to the calculated first mean autocorrelation;
displaying the autocorrelation stack of common water bottom time for each sub-line number; and
determining length and gap parameters for the plurality of operators responsive to the displayed autocorrelation stack of common water bottom time for each sub-Line number.

36. Program product as defined in claim 27, wherein the operations further comprise:
stacking seismic data into common depth point bins to form the three-dimensional stack data volume, the stacked seismic data comprising a plurality of seismic traces;
performing a plurality of autocorrelations on each of the plurality of stacked seismic traces;
averaging the correlated data in a plurality of domains;
applying the multi-domain deconvolution to the post-stack seismic data using terms derived from at least two of the plurality of different domains, to include:
determining a plurality of predictive deconvolution inverse operators responsive to the average correlated data in the plurality of domains, and
applying the predictive deconvolution inverse operators to the post-stack seismic data; and
identifying water bottom energy present in the post-stack seismic data responsive to application of the predictive deconvolution inverse operators to the post-stack seismic data.

37. A non-transitory computer readable medium that is readable by a computer to analyze seismic data, the computer readable medium comprising a set of instructions to suppress residual water bottom energy in seismic data that, when executed by the computer, cause the computer to perform the following operations:
receiving post-stack seismic data;
applying a multi-domain deconvolution to the post-stack seismic data using terms derived from at least two of a plurality of different domains to thereby suppress residual water bottom energy in a seismic data volume; and
providing seismic data providing an improved resolution responsive to suppression of the residual water bottom energy front within the post-stack seismic data.

38. A computer readable medium as defined in claim 37, wherein the operation of applying a multi-domain deconvolution to the post-stack seismic data includes using a combination of common water bottom times and sub-line numbers as an autocorrelation averaging reference for the multi-domain deconvolution.

39. A computer readable medium as defined in claim 37, wherein the operations further comprise:
stacking seismic data into common depth point bins to form the three-dimensional stack data volume, the stacked seismic data comprising a plurality of seismic traces;
performing a plurality of autocorrelations on each of the plurality of stacked seismic traces;
averaging the correlated data in a plurality of domains;
applying the multi-domain deconvolution to the stacked seismic data, to include:
determining a plurality of predictive deconvolution inverse operators responsive to the average correlated data in the plurality of domains, and
applying the predictive deconvolution inverse operators to the stacked seismic data; and
identifying water bottom energy present in the stacked seismic data responsive to application of the predictive deconvolution inverse operators to the stacked seismic data.

40. A computer readable medium as defined in claim 37, wherein the post-stack seismic data comprises a plurality of seismic traces, and wherein the operations further comprise:
computing an autocorrelation for each separate one of the plurality of seismic traces in the seismic data volume;
performing a multi-domain autocorrelation analysis on a plurality of different domains responsive to the plurality of autocorrelations, and
applying the multi-domain deconvolution to the post-stack seismic data using terms derived from at least two of the plurality of different domains to thereby identify and suppress the residual water bottom energy.

* * * * *

UNITED STATES PATENT AND TRADEMARK OFFICE
CERTIFICATE OF CORRECTION

PATENT NO. : 8,095,320 B2  
APPLICATION NO. : 12/394868  
DATED : January 10, 2012  
INVENTOR(S) : Roy Matthew Burnstad et al.

Page 1 of 1

It is certified that error appears in the above-identified patent and that said Letters Patent is hereby corrected as shown below:

Column 15, line 18, delete the word "a" after the word 'of' and insert the word --the--; and on line 56, delete the word "slack" and insert the word --stack--.

Column 17, line 55, delete the word "tenth" and insert the word --length--.

Column 18, line 50, add the word "a" after the word 'performing'.

Column 19, line 61, delete ":", and insert --;--; and on line 64, add the word "using" after the word 'data'.

Column 21, lines 4-5, delete the word "seismic", and add the word --the--; and on line 33, delete the word "Line" and add the word --line--.

Column 22, line 15, delete the word "front" and add the word --from--.

Signed and Sealed this  
Twenty-eighth Day of February, 2012

David J. Kappos  
*Director of the United States Patent and Trademark Office*